United States Patent Office 3,130,069
Patented Apr. 21, 1964

3,130,069
COMPOSITION AND METHOD FOR COATING LEATHER
Malcolm H. Battles, Andover, Joseph A. Bassett, Topsfield, Paul C. Cassidy, Lowell, and Mario Giella, Boston, Mass., assignors to Swift & Company, Chicago, Ill., a corporation of Illinois
No Drawing. Filed Aug. 3, 1960, Ser. No. 47,150
11 Claims. (Cl. 117—76)

This invention relates to the production of valuable new film forming and coating compositions and more particularly to the reaction products of modified polyamide resins and complex epoxides.

Unmodified polyamide resins of the type derived from polymeric fat acids and alkylene polyamines have in the past been reacted with complex epoxides to produce cured polyamides or cured epoxy resins. A variety of products ranging from rubbery, extremely flexible cured polyamides to hard, tough, insoluble, infusible epoxy resins may be produced by methods known in the prior art. These products and the method for curing polyamides and epoxy resins is described in Renfrew et al. Patent No. 2,705,223.

Cured polyamides and cured epoxy resins of the type described above are very satisfactory materials for use in certain industries such as in adhesives where appreciable tack is desirable and as potting and casting resins where strength and toughness are advantages. Yet in certain other areas of use, such as in the coating of metals, cellulosic materials and the treatment of leather to improve the properties thereof, requirements with respect to flexibility, clarity, freedom from tack, low temperature flexibility, etc., cannot be satisfied by means of any single product of the type heretofore suggested. Further, cured epoxy resins of the type required for coating cellulosic or leather substrates generally possess a short pot life and this, of course, is disadvantageous.

It is accordingly an object of this invention to provide reaction products of modified polyamide resins and complex epoxides which are flexible and substantially tack free.

Another object of the invention is the provision of a method for coating substrates with a flexible protective film of a cured modified polyamide resin.

A further object of the invention is the provision of valuable new resins prepared by admixing and reacting polyamides modified with nonresinous liquid monoepoxides with complex resinous diepoxides.

Still another object of the invention is the provision of improved coated cellulosic materials, metals and leather products and the like.

Additional objects if not specifically set forth herein will be readily apparent to those skilled in the art from the detailed description of the invention which follows.

Generally, the compositions of this invention comprise the reaction products of blocked polyamides and complex epoxides, the amount of blocking of the polyamide being sufficient to reduce the tack of the polyamide and the complex epoxide being present in an amount sufficient to impart strength and toughness to the polyamide but insufficient to render the reaction product excessively brittle. The compositions are particularly useful in the coating of cellulosic and leather substrates and a preferred use resides in the top or finish coating of leather products.

The polyamides which contain reactive amine groups providing sites for blocking with the monoepoxide, are resinous condensation products of polymeric fat acids and aliphatic polyamines. The production of these polyamides is described in Cowan et al. Patent No. 2,450,940. Preparation of these polyamides involves the reaction between aliphatic polyamines such as diethylene triamine, triethylene tetramine, tetraethylene pentamine, 3,3'-iminobis-propylamine and related polyalkylene polyamines with polymeric fat acids resulting from the polymerization of drying or semidrying oils or from free polyene fatty acids of 10–22 carbons or simple alcohol esters thereof. Polymeric fat acids suitable in the preparation of the polyamide include the polymerized mixture of acids derived from such naturally occurring materials as peanut oil, cottonseed oil, soybean oil, corn oil, linseed oil, tung oil, tall oil, etc.

Because there are a large number of polyamides of polymeric fat acids possible, it is desirable to also define the polyamide by physical constants. Low melting polyamide resins melting within the approximate range of 25–95° C. are prepared from polymeric fat acids and aliphatic polyamines having at least 3 atoms intervening between the amine groups which are involved in the amidation reaction. These polyamides may be liquids at room temperature or are soft, tacky resins that are semisolids at room temperature and have an amine number of around 80–320. Also, these polymers exhibit a penetration as measured by A.S.T.M. method D–5–52 at 25° C. of 90 or above. The amine number of these materials is defined as the number of milligrams potassium hydroxide equivalent to the free amine groups present in one gram of the resin. The amine number gives a measure of the amount of free amine groups present in the polyamide.

Blocking or modification of the polyamide resin to provide modified polyamides is attained by reacting the desired number of total reactive amine groups in said polyamide with a nonresinous monoepoxide. Suitable monomeric monoepoxides are the lower oxirane containing aliphatic hydrocarbons, fatty acids, alcohols, esters, ethers or other aliphatic derivatives having 6–8 carbons and being free of interfering substituents. Straight chain aliphatic hydrocarbon epoxides having 6–8 carbons such as octylene oxide (2,3 epoxy octylene) and lower aliphatic oxirane containing ethers such as butyl glycidyl ether, amyl glycidyl ether and hexyl glycidyl ether are particularly desirable in blocking amine groups in the polyamide to render the polymer flexible and substantially tack free. The lower aliphatic epoxy alcohols, such as 3,4-epoxy hexanol, 2,3-dimethyl-4,5-epoxy octanol, 2-methoxy-4,5-epoxy octanol, 3,4-epoxy cyclohexanol, 2,3-epoxy cyclohexanol and epoxy acids and esters of these materials with non-epoxy alcohols and non-epoxy acids the total chain length of the molecule not exceeding 8 carbons are also suitable in modifying the polyamides.

The molecular size of the blocking agent and the amount of blocking effected are both important in producing a coating of the desired physical properties. The lower monoepoxides such as ethylene oxide and propylene oxide have little effect on the flex life of the film ultimately formed, while long chain monoepoxides do not reduce the tack of the film sufficiently. Those aliphatic monoepoxides having 6–8 carbons provide the optimum reduction in tack of the polyamide resin while insuring good flexibility and flex life in the film. The amount of blocking with the monoepoxide determines how many free amine groups are left in the polyamide for subsequent reaction with the polyepoxide. If blocking in excess of 50–60% is attempted, the increase in flex life over that obtained with around 40% blocking is negligible. Too little blocking results in the production of substantially tack free film of very low flex life.

The amount of blocking is dependent upon the amount of blocking agent employed to react with the amino hydrogens of the polyamide. If the polyamide is blocked about 30–50% with the monoepoxide, and preferably around 35–45% with the monoepoxide, a very desirable coating and film forming composition can be formed by treatment of the blocked polyamide with the complex polyepoxide. The amount of blocking is calculated from the following equation:

$$\frac{\text{grams polyamide resin} \times F \times \text{molecular weight monoepoxide} \times \text{percent blocking desired}}{\text{acid equivalent weight of polyamide obtained by titration}} = \text{grams monoepoxide}$$

F is a factor indicating the ratio of the number of primary and secondary amino groups present in the polyamide.

$$F = \frac{2(\text{primary amino groups}) + (\text{secondary amino groups})}{(\text{primary amino groups}) + (\text{secondary amino groups})}$$

The number of primary amino groups can be determined by reacting the polyamide with benzaldehyde and measuring the amount of water formed. Primary plus secondary amino groups can be determined by acid titration and secondary amino groups by difference. Thus, it can be seen that given a desired amount of blocking and a particular blocking agent, it is possible to determine how much of the blocking agent should be employed for a given polyamide. The blocking reaction is carried out by heating the monoepoxide and polyamide to a temperature sufficient to react epoxy and amine groups. This temperature depends upon the monoepoxide used. The shortest reaction time can be attained by using temperatures at which refluxing of the monoepoxide occurs. The blocking reaction is desirably carried out in a solvent medium employing agitation of the reaction mixture, however, with proper equipment the reaction can be carried out in the absence of solvent.

The reaction temperature is not critical and the usual time-temperature function is applicable. At lower temperatures the reaction must be carried out for longer periods of time than is the case when higher temperatures are employed. Generally it is convenient to conduct the reaction at the temperature at which the monoepoxide refluxes or where low boiling solvents are employed at approximately the reflux temperature of the solvent. It is preferred that the reaction be conducted at a temperature in excess of about 90° C. to insure completion of the reaction in a reasonable period of time. Usually temperatures in the range 80°–200° C. and reaction times of 1–4 hours are satisfactory. Extremely high temperatures bordering on pyrolysis of the reactants are, of course, to be avoided.

Blocking of the polyamide is carried out in the following manner:

*Example I*

A polyamide having an amine number of 88, a melting point of around 48° C., and a viscosity of around 12 poises at 150° C. is dissolved by heating 1250 grams of the polyamide in 840 grams of toluene. The resin solution is stirred vigorously in a reaction vessel equipped with a dropping funnel, a thermometer and condenser. The temperature of the solution is elevated to 120° C. and 108 grams of octylene oxide is added in a rapid stream from the dropping funnel. The temperature is maintained for a period of 4 hours. After cooling, the modified polyamide is recovered. The product is quite different from the unblocked polyamide in the following respects: (1) The blocked product has a lower viscosity especially at the lower temperatures, (2) its chemical structure has been altered to reduce the number of potentially reactive sites. While 40% of the available amino hydrogens in the polyamide are reacted by the foregoing procedure, the remaining amino hydrogens are available for reaction with the complex epoxide.

The complex epoxide resin composition employed in admixture with the modified polyamide is a polymeric reaction product obtained by reacting polyhydric phenols with poly-functional halohydrins. The materials may be prepared in accordance with Greenlee Patent No. 2,585,115 and can be described as resins containing an average of about two terminal epoxy groups per molecule. Compositions such as the products obtained from the reaction in alkaline medium of 1–5 moles of bisphenol with 2–6 moles of epichlorohydrin are suitable for this purpose. These compositions have the structure:

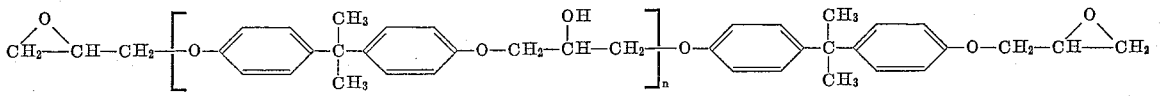

with differences between these complex epoxides being attributable to molecular weight which increases as $n$ is increased.

The molecular weights of these materials which are most suitable in the practice of the invention range from about 340–1476. These complex epoxides are soluble in ketones such as methylethyl ketone, acetone, diacetone alcohol, cyclohexanone, etc. and range from the lower molecular weight more fluid resins to higher molecular weight hard grade resins. Epon 864 is a viscous material readily pourable when heated only slightly above room temperature, has an epoxide equivalent of 300–375 and a viscosity of $A_1$–B on the Gardner-Holdt scale. Epon 1001 has a melting point of 64–76° C., a Gardner-Holdt viscosity of D–G and an epoxide equivalent of 450–525. Epon 1004 has higher melting point, higher viscosity and higher epoxide equivalent. The preferred Epon, which products are produced by the Shell Chemical Corporation is Epon 828 which is a liquid, has a viscosity of 124 poises at 25° C. and an epoxide equivalent of 175–210. Also, satisfactory as the complex epoxide compounds are the Araldite resins produced by the Ciba Corporation. Araldite 502, which is a low molecular weight liquid diepoxide is particularly satisfactory in preparing the novel compositions disclosed and claimed herein. The Araldite resins, like the Epons, contain terminal oxirane groups and are generally diepoxides.

A stoichiometric amount of the complex epoxide based upon the modified polyamide is employed to produce the most satisfactory coating or film. As the amount of complex epoxide reacted with the modified polyamide is increased over the stoichiometric amount, flex life of the film produced is substantially reduced. Nevertheless, it appears that satisfactory, but less than the most desirable films result when 10% more or less than a stoichiometric amount of the complex epoxide is employed. By "stoichiometric amount" is intended that amount of the complex epoxide to provide an equivalent number of epoxy groups for the number of available reactive amino groups in the polyamide. This amount can be calculated from the blocking formula using 100% as the percent blocking desired and substituting the amount of complex epoxide for monoepoxide and the amount of blocked polyamide for polyamide resin.

The polyepoxide-modified polyamide compositions are prepared as follows:

*Example II*

The toluene solution of blocked polyamide from Example I is combined with a solution of 324 grams Araldite 502 epoxy resin in 613 grams methyl isobutyl ketone. The mixture of the two solutions is vigorously agitated and the mixture is further diluted with 590 grams toluene and 475 grams butanol. The resulting solution although continuously undergoing a small amount of cross-linking has an effective practical working life of at least 48 hours.

*Example III*

A solution of 250 grams of a fluid polyamide having an amine value of 212 (Versamide 115) is prepared by heating the polyamide in 167 grams xylene at 140° C. The solution is held at 140° C. and agitated while 70 grams butyl glycidyl ether is added through a dropping funnel. After addition of the butyl glycidyl ether, the reaction is continued for 4 hours by agitating the reaction mixture and maintaining the temperature at 140° C. The reaction product which is a blocked polyamide in solution is then mixed with a liquid diepoxide resin (103 grams Epon 828 dissolved in 152 grams methyl isobutyl ketone). After dilution of the blocked polyamide-complex epoxide mixture, with 195 grams toluene and 121 grams butanol the solution is ready for use in preparing protective coatings.

These compositions are best applied to surfaces to be coated from solution or dispersion. Spraying, roller coating, flow coating, etc., and other techniques known in the art may also be employed. With paper, for example, films may be cast from solutions or dispersions or the paper may be spray coated. In the coating of leather, particularly in the coating of leather for shoe uppers, belts, purses, etc., to provide a patent leather finish, the compositions exhibit outstanding benefits. In the production of patent leather, the leather is first coated with a base coat to seal the surface of the leather. The base coating serves to provide a smooth base upon which the decorative and protective top coat can be applied. This base or daub coat should be quick-setting, should require a minimum amount of cure, or no cure, and should not be susceptible to removal by solvents employed in depositing the top coat. Also, the base coat should be resistant to penetration or "wicking" of the top coat, yet should possess good adhesive properties and permit development of a good bond between the top coat and the base coat. Conventional oxidized polymerized linseed oil base coats satisfy most of these requirements. The top coat which is applied over the base coat should bond to the base coat but should not penetrate the base coat. Also, the top coat should present a high gloss or sheen, should be susceptible to the use of pigments and should provide good low temperature flexibility, high abrasion resistance, high gloss, low blocking, high solvent resistance, good resistance to flexural fatigue, and good ease of applicability and working in the shoe factory. The following examples show the method of applying the top coat to leather.

*Example IV*

A piece of hide first coated with a daub or sealer coat of oxidized polymerized linseed oil is passed horizontally on a conveyor beneath a series of spray guns containing the solution prepared in Example III. The spray guns deposit an even coating of the fluid top coating on the prepared hide. The thickness of the coating may be varied considerably by adjusting the amount of coating material being discharged from the spray guns and the rate at which the hides are moved under the spray guns. The coating thickness is determined by the characteristics desired in the coated product. The wet coated hide is dried and the top coat is cured by exposing the coated hide to a source of heated air at 140°–180° F. After about 3–5 hours, exposure of the hide to the circulating air, a cured coating having good flex life and gloss is produced.

*Example V*

A hide which is daub coated with a homogenized gel dispersion of a blocked polyamide cross-linked with a complex epoxide (disclosed in co-pending application Serial No. 65,011, filed October 26, 1960) is passed through a falling curtain of the product of Example II in a commercial flow coater. Passage of the hide through the top coating material is controlled at a rate which insures that the curtain does not break and become discontinuous. The coating on the hide is then cured after removal of solvent by means of heated air. Curing, which involves reaction between the blocked polyamide and complex epoxide requires about 3–5 hours at a temperature in the range 140°–180° F. Longer curing times are required if lower temperatures are employed while curing can be accelerated if higher temperatures are employed.

Obviously many modifications and variations of the invention as hereinbefore set forth may be made without departing from the spirit and scope thereof and therefore only such limitations should be imposed as are indicated in the appended claims.

We claim:

1. A coated leather product having a glossy, flexible top coating comprising: leather which has been coated with a daub coat and overlying said daub coat at a heat-cured continuous coating of the reaction product of a modified polymeric polyamide and a stoichiometric amount ±10% of an epoxy resinuous material containing terminal epoxy groups, said polyamide having an amine number of around 80–320 being the reaction product of polymeric fat acids selected from the group consisting of polymerized 10–22 carbon fatty acids and esters thereof and alkylene polyamine, said polyamide being modified by reaction with $C_6$–$C_8$ aliphatic monoepoxides and having at least 30% and not more than 60% of the amino hydrogens blocked to inhibit reactivity.

2. A method of preparing coating and film forming compositions having good flexibility and freedom from tack comprising: mixing a modified polyamide resin with a polymeric polyepoxide, said modified polyamide being the reaction product of the resinous polyamide reaction product of polymeric fat acids selected from the group consisting of polymerized 10–22 carbon polyene fatty acids and esters thereof and alkylene polyamines and a short-chain $C_6$–$C_8$ monoepoxide blocking agent, the amount of said blocking agent being sufficient to block 30–60% of the reactive amino groups in said polyamide, said polymeric polyepoxide being the reaction product of a bisphenol and epichlorohydrin.

3. A method of preparing coating and film forming compositions having good flexibility and freedom from tack comprising: mixing a modified polyamide resin having a melting point within the approximate range of 25–95° C. with a polymeric polyepoxide, said modified polyamide being the reaction product of a resinous polyamide reaction product of polymeric fat acids selected from the group consisting of polymerized 10–22 carbon polyene fatty acids and esters thereof and alkylene polyamines and short-chain aliphatic monomeric monoepoxides of 6–8 carbons in an amount sufficient to block 30–60% of the reactive amino hydrogens in said polyamide, said polymeric polyepoxide being an epoxy resinous material containing terminal epoxy groups.

4. A method of preparing coating and film forming compositions having good flexibility and freedom from tack comprising: mixing a modified polyamide resin with a polymeric polyepoxide, said modified polyamide being the reaction product of a resinous polyamide having an amine number of around 80–320 and being the reaction product of polymeric fat acids selected from the group consisting of polymerized 10–22 carbon polyene fatty acids and esters thereof and alkylene polyamines and an aliphatic monooxirane-containing hydrocarbon derivative of 6–8 carbons, the modified polyamide having at least 30% and not more than 60% of the amino hydrogens blocked to inhibit reactivity.

5. A method comprising heating and reacting a blocking agent with a resinous polyamide and further reacting said polyamide with a complex epoxide to provide a flexible abrasion-resistant polymer, said blocking agent comprising an aliphatic monooxirine-containing hydrocarbon derivative of 6–8 carbons, said polyamide being the reaction product of polymeric fat acids selected from the group consisting of polymerized 10–22 carbon polyene fatty acids and esters thereof and alkylene polyamines and said complex epoxide being an epoxy resin having terminal epoxy groups the amount of said blocking agent employed being sufficient to block 30–60% of the reactive amino hydrogens in said polyamide the amount of said complex epoxide being a stoichiometric amount ±10% based on the amine number of said modified polyamide.

6. A film forming and coating composition comprising: a mixture of an epoxy resinous material containing terminal epoxy groups and a modified polymeric polyamide, said polyamide having an amine number of around 80–320 and being the reaction product of polymeric fat acids selected from the group consisting of polymerized 10–22 carbon polyene fatty acids and esters thereof having at least two carboxyl groups and alkylene polyamines, said polyamide being modified by reaction with a sufficient amount of $C_6$–$C_8$ aliphatic monoepoxides to block at least 30%, and not more than 60% of the amino hydrogens of said polyamide.

7. A film forming and coating composition comprising: a mixture of a modified polymeric polyamide and a stoichiometric amount ±10% of an epoxy resinous material containing terminal epoxy groups, said polyamide being the reaction product of polymeric fat acids selected from the group consisting of polymerized 10–22 carbon polyene fatty acids and esters thereof and having at least two carboxyl groups and alkylene polyamines, said polyamide being modified by reaction with $C_6$–$C_8$ aliphatic monoepoxides to block 30–60% of the reactive amino hydrogens in said polyamide.

8. A film forming and coating composition comprising a mixture of a modified polymeric polyamide and a stoichiometric amount of an epoxy resinous material, said polyamide being the reaction product of polymeric fat acids selected from the group consisting of polymerized 10–22 carbon fatty acids and esters thereof having at least two carboxyl groups and alkylene polyamines, said polyamide being modified by reaction with an amount of aliphatic $C_6$–$C_8$ monoepoxides sufficient to provide 30–60% blocking of said polyamide.

9. The composition of claim 8 wherein the monoepoxide is butyl glycidyl ether.

10. The composition of claim 8 wherein the monoepoxide is octylene oxide.

11. The composition of claim 8 wherein the amount of $C_6$–$C_8$ monoepoxides is sufficient to provide 35–45% blocking of said polyamide.

References Cited in the file of this patent

UNITED STATES PATENTS

| | | |
|---|---|---|
| 2,872,428 | Schroeder | Feb. 3, 1959 |
| 2,943,953 | Daniel | July 5, 1960 |
| 2,955,958 | Brown | Oct. 11, 1960 |
| 2,989,420 | Zdanowski | June 20, 1961 |

FOREIGN PATENTS

| | | |
|---|---|---|
| 776,375 | Great Britain | June 5, 1957 |